United States Patent [19]

Winkler

[11] Patent Number: 4,818,367

[45] Date of Patent: Apr. 4, 1989

[54] ASPHALT, COPOLYMER AND ELASTOMER COMPOSITION

[75] Inventor: David S. Winkler, Wooster, Ohio

[73] Assignee: J. H. Diamond Company, Lake Worth, Fla.

[21] Appl. No.: 851,835

[22] Filed: Apr. 14, 1986

[51] Int. Cl.$^4$ .................... C08L 95/00; C10C 1/00
[52] U.S. Cl. .................... 208/23; 208/22; 524/62; 524/69; 525/54.5; 527/500; 106/273.1; 106/284.4; 106/281.1
[58] Field of Search ........ 208/22, 23; 106/273 R, 106/273 N, 281 R; 524/69, 62; 525/54.5; 527/500

[56] References Cited

U.S. PATENT DOCUMENTS

| | | | |
|---|---|---|---|
| 2,347,626 | 4/1944 | Bradley | 208/22 |
| 2,550,476 | 4/1951 | Hersberger | 106/273 |
| 2,815,296 | 12/1957 | Young et al. | 106/273 R |
| 3,012,485 | 12/1961 | Bradley | 427/386 |
| 3,182,032 | 5/1965 | Charlton | 525/54.5 |
| 3,259,512 | 7/1966 | Dickson | 106/273 |
| 3,298,971 | 1/1967 | Davie | 106/285 |
| 3,453,226 | 7/1969 | Corbett | 208/22 |
| 3,483,153 | 12/1969 | Pitchford | 106/273 |
| 3,491,047 | 1/1970 | Hotten | 260/28.5 |
| 3,507,831 | 4/1970 | Avis | 106/273 R |
| 3,531,426 | 9/1970 | Shim | 260/28.5 |
| 3,560,456 | 2/1971 | Hazen | 260/785 |
| 3,586,659 | 6/1971 | Hay et al. | 260/78.5 T |
| 3,732,337 | 5/1973 | Heilman | 260/897 B |
| 3,788,970 | 1/1974 | Peck et al. | 208/22 |
| 3,892,700 | 7/1975 | Burke | 260/29.6 R |
| 3,900,440 | 8/1975 | Ohara et al. | 260/29.7 W |
| 3,955,036 | 5/1976 | Plueddemann | 428/429 |
| 3,981,851 | 9/1976 | Plueddeman | 526/267 |
| 3,985,694 | 10/1976 | Petrucco et al. | 524/518 |
| 3,997,493 | 12/1976 | Morgan et al. | 260/29.7 |
| 4,011,184 | 3/1977 | van Reijendam et al. | 260/285 |
| 4,018,847 | 4/1977 | Messerly | 260/831 |
| 4,025,672 | 5/1977 | Hossenfelder | 427/388 |
| 4,070,325 | 1/1978 | Burke, Jr. | 106/277 |
| 4,071,400 | 1/1978 | Jankowiak | 162/169 |
| 4,087,572 | 5/1978 | Nimerick | 427/214 |
| 4,139,511 | 2/1979 | Hayashi et al. | 260/28.5 |
| 4,175,978 | 11/1979 | Marzocchi et al. | 106/281 R |
| 4,178,186 | 12/1979 | Yasui et al. | 106/20 |
| 4,196,115 | 4/1980 | Bresson | 260/285 B |
| 4,207,231 | 6/1980 | Goodrich | 260/104 |
| 4,237,052 | 12/1980 | Fitoussi et al. | 527/500 |
| 4,248,749 | 2/1981 | Hayashi et al. | 106/281 R |
| 4,251,586 | 2/1981 | Marzocchi et al. | 106/281 R |
| 4,265,563 | 5/1981 | Marzocchi et al. | 404/75 |
| 4,273,685 | 6/1981 | Marzocchi et al. | 427/389.8 |
| 4,301,051 | 11/1981 | Marzocchi et al. | 428/394 |
| 4,302,370 | 11/1981 | Buse | 106/273 R |
| 4,314,921 | 2/1982 | Biegenzein | 106/273 R |
| 4,316,829 | 2/1982 | Roberts | 106/273 R |
| 4,328,147 | 5/1982 | Chang et al. | 106/273 R |
| 4,332,704 | 6/1982 | Marzocchi et al. | 527/500 |
| 4,341,839 | 7/1982 | Shaw et al. | 428/342 |
| 4,347,266 | 8/1982 | Norman et al. | 427/154 |
| 4,361,672 | 11/1982 | Agareval et al. | 525/54.5 |
| 4,412,864 | 11/1983 | Kurashige et al. | 106/235 |
| 4,413,073 | 11/1983 | Gibson et al. | 523/511 |
| 4,425,453 | 1/1984 | Hunter | 106/273 R |
| 4,444,947 | 4/1984 | Harrington et al. | 525/54.5 |
| 4,451,598 | 5/1984 | Decroix | 524/69 |
| 4,459,157 | 7/1984 | Koons | 106/278 |
| 4,460,723 | 7/1984 | Rollmann | 524/70 |
| 4,518,741 | 5/1985 | Uffner et al. | 525/54.5 |
| 4,547,224 | 10/1985 | Schilling | 106/273 R |
| 4,561,901 | 12/1985 | Schilling | 106/277 |

FOREIGN PATENT DOCUMENTS 0204937 12/1983 Fed. Rep. of Germany ... 106/273 R
1584504 2/1981 United Kingdom .......... 106/273 N

OTHER PUBLICATIONS

Brochure of Chevron Chemical Company on Chevron/Gulf Product PA-18.

Primary Examiner—H. M. S. Sneed
Assistant Examiner—Helane Myers
Attorney, Agent, or Firm—Pollock, Vande Sande & Priddy

[57] ABSTRACT

An asphalt composition containing an asphalt, a copolymer of an olefin with an anhydride or a nitrile, and an unsaturated elastomer having at least two terminal groups each with an active hydrogen, a halogen, an epoxy oxygen or a cyanocarbon. The composition may be prepared by copolymerizing an olefin with an anhydride or a nitrile in the presence of a free radical initiator, and thereafter mixing the copolymer with the asphalt and elastomer. The copolymer may be mixed first with a petroleum oil, then with the elastomer and lastly with the asphalt. The copolymer may be a polyanhydride from maleic anhydride and 1-octadecene and the elastomer may be a hydroxy-terminated polybutadiene.

50 Claims, 3 Drawing Sheets

ASPHALT, COPOLYMER AND ELASTOMER COMPOSITION

Technical Field

This invention relates to an improved asphalt composition. More particular, asphalt is chemically modified by admixture with a copolymer, an unsaturated elastomer, and optionally a petroleum oil.

BACKGROUND OF THE INVENTION

Asphalt is one of the oldest building materials known and is widely used as a paving and a roofing material. Presently, approximately 70% of all asphalts in the United States are consumed by the road paving industry, about 20% are consumed by the roofing industry, and the remainder are used for certain specialty products such as adhesives and coatings. Asphalt occurs in natural deposits and as a by-product from the processing of crude oil. The term "asphalt" is commonly applied today to petroleum residues that, for the most part, are soluble (nearly 100%) in carbon disulfide or aromatics solvents such as toluene.

The physical characteristics of asphalts vary widely, depending upon their constituents. Colloidal dispersions of asphalts present in crude oil are high molecular weight hydrocarbons and are generally referred to as asphaltenes. Asphalts also include oils in which the asphaltenes may be dispersed and resins. At least some of the resins can cause peptization of the asphaltenes. The relative quantities and physical properties of the asphaltenes, the oils, and the resins determine the physical characteristics of a given asphalt. For example, these characteristics are dependent upon the particle size of the asphaltenes as dispersed in the oily phase. A portion of the asphaltenes may be of such a small size as to provide a colloid of the sol type which is in reality a true solution rather than a dispersion. One characteristic of a sol type asphalt is a sharp transition upon heating from a glassy solid at low temperatures to a liquid of relatively low viscosity at elevated temperatures.

The solubility of water in asphalt is quite low and appears to dissolve in asphalt only as a gas. However, greater quantities of water may be absorbed in asphalt compositions because of constituents other than the asphalts, such as filler materials. Inorganic fillers may absorb water to varying degrees, and the presence of water on filler materials may lead to poor adhesion of the asphalt binder to the filler materials.

When used in certain applications such as paving materials, asphalts are mixed with coarse aggregate such as crushed stone, fine aggregate such as sand and stone dust or other inorganic fillers. A typical asphalt paving composition may contain about 54% coarse aggregate, about 35% fine aggregate, about 5% stone dust, and about 6% asphalt which serves as the binder. Paving compositions are generally made up and applied in either one of two ways, namely, cold-mixed and cold-laid or hot-mixed and hot-laid.

Since asphalt serves as the binder in paving and roofing compositions containing a filler material, it is the component that furnishes the adhesion to hold the particles of inorganic mineral aggregates or other filler materials together. Asphalt also furnishes the flow properties necessary to properly wet and coat surfaces of the aggregates and fillers and to apply the resulting mix to a surface or substrate, and the durability of the product as required for a suitable service life. Particularly important properties for a durable and adhesive asphalt are (1) significant plastic deformation without rupture (ductility) in order to resist thermal stresses and load stresses, and (2) significant elastic deformation (elasticity) to permit elastic recovery instead of plastic flow under shock loading so as to absorb shock loads without significant plastic deformation. Nearly all jurisdictions responsible for paving specifications require a ductility test as specified by the Federal Bureau of Public Roads. This ductility test uses a test sample conforming to ASTM Standard D113 and tested in a water bath maintained at 77° F. In order to pass this test, the test sample must have a ductility of at least 50, 75 or 100 centimeters, depending upon the grade of asphalt cement selected, when tested at a rate of 5 centimeters per minute.

Under the influence of atmospheric moisture and ambient temperature variations, as well as load stresses, the asphalt binder may peel off of the aggregate or other filler material after a year or two of use. It is therefore desirable to provide asphalt compositions which are capable of producing pavements, roofing materials and other products having good stripping-resistance in the presence of moisture and varying temperatures. The term "stripping-resistance" as used in this specification means the resistance of the asphaltic binder to peeling from the aggregate or other filler when the mix of asphaltic binder and aggregate has been applied as a film to a substrate, for example, pavement applied to a foundation layer or directly onto soil.

Asphalts applied as paving or roofing essentially function as thin films and these films age and undergo structural changes much more rapidly than when the asphalt is in its bulk form. Aging results in increased hardness of the asphalts due to exposure to various physical agents, such as physical and thermal stresses, and chemical agents, such as water, oxygen, ozone and the ultraviolet band of sunlight. Such hardening occurs at different rates depending on a variety of factors, including the film's permeability to air and water, the range of ambient temperatures to which it is exposed, and the frequency of wetting and drying cycles. Aging also results in increased viscosity and other rheological changes, all of which may lead to relatively early failure in service, i.e., a shortening of the service life of the product. The presence of water also may result in a loss of adhesion between the asphalt and the fillers.

The hardening of asphalts may be due in part to changes in its chemical composition because of a loss of volatiles by evaporation and/or a loss of the oily phase by selective adsorption of oils into the aggregate or by a mechanism referred to as "sweating". When these changes occur, the hardness of the asphalt increases, its ductility decreases, and it becomes even more susceptible to the adverse effects of oxidation and water absorption.

The durability of the asphalt, therefore, is a prime consideration in selecting an asphalt composition for many applications. A number of methods have been suggested in the past in an effort to improve asphalt durability. One method suggested is to blend different asphaltic components separated from naturally occurring and/or petroleum derived asphalts. A second method is the addition of synthetic additives to modify the rheological and chemical properties of an asphalt. Such additives in the past have included various polymers which may lend their rheological properties to those of the asphalt to which they are added.

A rather significant problem associated with the use of prior art polymers is the difficulty of bringing them into solution with the hot asphalt. The time and temperatures required to disperse at least some of these polymers is so high as to result in significant oxidation of the polymer and/or the asphalt. Such oxidation increases the hardness and decreases the ductility of the polymer/asphalt blend. Also, blending these polymers into the asphalt requires high energy mixing over relatively long periods of time (an hour or more). Thus, substantial amounts of money could be saved if the time and energy involved in achieving a homogeneous mixture of the added polymer and the asphalt could be reduced significantly.

In the case of paving applications, it is often necessary to maintain the asphalt-containing material in its heated fluid state for extended periods of time (more than one day). In the presence of the fluidizing heat and high shear mixing conditions required to provide a dispersion of prior art polymers, a serious problem was found to occur wherein certain polymer/asphalt blends undergo a sudden rapid increase in viscosity which may render the blend completely useless or may greatly increase the difficulty of handling the blend for further use. Sometimes it is not possible to identify these blends in advance because only certain asphalts appear to be susceptible to this problem of sudden viscosity increase after an extended mixing time with the polymer.

The loss of ductility of an asphalt with mixing or the onset of a rapid viscosity increase after an extended mixing time for an asphalt/polymer blend may be due, at least in part, to the inclusion of air into the composition by the mixing operation. Extended heating of a modified asphalt composition also may result in depolymerization of the additive polymer and at the same time may cause asphaltenes to coagulate. Another problem with modified asphalts of the prior art is that mixtures containing more than 5% polymer may exhibit a phase reversion wherein the polymer swells and becomes the continuous phase of a colloidal system in which the asphalt is the dispersed phase. This reversion also causes coagulation of the asphaltenes.

DISCLOSURE OF THE INVENTION

The present invention discloses an asphalt composition containing an elastomer and copolymer additive which overcomes or at least alleviates the foregoing deficiencies of the prior art. The composition is prepared by combining a select copolymer with a select elastomer and an asphalt to provide a product having improved and valuable properties. More particularly, the invention provides an additive which can be added quickly (one or two minutes) to asphalts at relatively low temperatures (at or about the melting point for liquification of the asphalt), and substantially reduces the viscosity and increases the ductility, oxidation resistance and stripping resistance of the asphalt.

The copolymer is prepared by copolymerizing, an anhydride or a nitrile with an olefin. The olefin is preferably a aliphatic alpha-olefin such as 1-hectadecene, 2-hectadecene, 1-heptadecene, 1-octadecene, 2-octadecene, or 2-methyl-1-heptadecene, and preferably is copolymerized with an anhydride such as maleic anhydride, citraconic anhydride, itaconic anhydride, glutaconic anhydride or methyl itaconic anhydride. Prior to mixing the copolymer with the other ingredients, it is preferably premixed and may undergo a preliminary reaction with a petroleum oil. While the petroleum oil may be aromatic or cycloparaffinic, a major portion of the petroleum oil is preferably paraffinic. The elastomer is unsaturated and has at least two terminal groups each with an active hydrogen, a halogen, an epoxy oxygen or a cyanocarbon. The unsaturated elastomer is preferably hydroxy terminated.

Most preferably, the asphalt composition is prepared by mixing a copolymer of maleic anhydride and 1-octadecene with a paraffinic petroleum oil and then mixing this copolymer and oil mixture with an asphalt and a hydroxy terminated polybutadiene. The copolymer and oil mixture may first be mixed with the elastomer and thereafter mixed with the asphalt.

The asphalt composition of the present invention has a number of advantages over the polymer/asphalt blends of the prior art. Extended mixing times are not required to achieve a homogeneous blend of the additive with the asphalt so that the asphalt is exposed to less oxygen and significant oxidation of the asphalt and/or the additive components is thereby avoided. High temperatures are not required to achieve homogeneous blends because blending is accomplished at or only slightly above the melting temperature of the asphalt. This lower temperature blending avoids substantial depolymerization of the elastomer and the copolymer.

Another advantage of the invention is that the modified asphalt has a lower viscosity than the asphalt alone and this viscosity does not increase substantially over extended mixing periods at application temperatures. Furthermore, the modified asphalt may contain substantially more than a 5 weight percent loading of the additive without phase reversion and coagulation of the asphaltenes. The modified asphalt thus possesses characteristics which greatly ease the handling of this material and its application. This ease of handling, combined with shortened mixing times and reduced temperatures, provides substantial savings in cost and increases in production efficiency and permits the use of existing asphalt facilities. The improved rheological properties of the modified asphalt are of particular importance in the use of this composition as a binder in paving mixes, as a sealant in roofing compositions, and in various other industrial applications. Paving mixes using the modified asphalt are particularly useful in regions with very high temperatures in the summer and very low temperatures in the winter because the paving mixes possess both an adequate elasticity (resistance to plastic deformation) at the high temperatures and an adequate plasticity (ductility) at the low temperatures.

The asphalt composition of the present invention has enhanced durability when subjected to a wide range of ambient weather conditions (weatherability). It is believed that structural hardening of the modified asphalt composition with time is prevented by several different mechanisms, including preventing the loss of both volatile components and oily components, and preventing oxidation of the constituents of the composition. The Asphalt Aging Index of an asphalt thus may be substantially reduced by mixing the additive of the present invention with the asphalt at just above its melting temperature. Improved ductility of the modified asphalt at lower temperatures (e.g., below freezing) enable relatively low penetration asphalts to meet the ductility specifications for asphalts used in paving public roads. The additive also inhibits the action of water, ozone, sunlight and other chemical agents to which asphalt compositions may be exposed.

At the higher loadings of the additive, the modified asphalt possesses properties which make it extrudable and the composition may be extruded as a relatively thin film that possesses sufficient tensile strength to be used for sheeting, roofing membranes and other self-supporting products. The composition also has tackiness and may be used as a tackifier for styrene-butadiene (SBR) rubbers in the manufacture of belted automobile tires. Where mercapto groups are present in the elastomer or elemental sulfur or sulfur compounds are included in the additive, it is believed that the composition of the invention may be cured (vulcanized) as a new type of synthetic rubber.

The present invention also provides a method of readily incorporating the asphalt additive (modifier) into the asphalt. The additive includes a copolymer, an elastomer and, optionally, a petroleum oil. Each of these components is of relatively low viscosity and has excellent miscibility with asphalt. Depending upon the viscosity and temperature of the asphalt, a homogeneous mixture of the asphalt and the additive components may be achieved in as little as 30 seconds and in no more than a few minutes.

The Asphalt

The asphalt providing the asphaltic component of the composition of the invention is an asphalt or petroleum tar which is generally used for road paving applications. Thus, the term "asphalt" means either natural asphalt or petroleum derived asphalt or petroleum tar. The natural asphalts include, for example, asphaltites such as gilsonite, grahamite and glance pitch; lake asphalts such as trinidad asphalt; and rock asphalts. The petroleum derived asphalts include straight run asphalts obtained by distillation of a crude oil, blown asphalts produced by blowing an oxygen-containin gas into straight asphalts in the presence or absence of a catalyst, solvent-extracted asphalts yielded when asphaltic material is separated from petroleum fractions by the use of propane or other solvents, cut-back asphalts which are a mixture of straight asphalts and more volatile petroleum components, and blends of these asphalts. The petroleum tars that may be used include coal tars obtained by distillation of coal and/or oil, gas tars obtained as a by-product when gases are produced from petroleum fractions, other refinery tars, cut-back tars obtained by incorporating volatile petroleum fractions into petroleum tars, and tar pitches which may be obtained as a residue upon removing volatile fractions from various tar fractions. Any of these kinds of asphalts may be used alone or in admixture.

The asphaltic material that is preferably used in this invention is one or more of the above natural or petroleum asphalts. This is because coal tars are generally more sensitive to a change of temperature than the asphalts. The preferred asphalts include steamed reduce asphalts, and topped crude and other still bottoms of crude oil refining, such as AC-3 and AC-20 as designated in accordance with ASTM-D-3381-81 entitled Viscosity-Graded Asphalt Cement For Use in Pavement Construction, the entire contents of said standard specification being incorporated herein by reference. An example of a preferred asphaltic material is straight asphalt or petroleum derived asphalt having an ASTM penetration of about 20 to about 300, more preferably about 80 to about 200; a softening point (ASTM-D-36-56) in the range from about 25° C. to about 90° C.; and a viscosity at 60° C. in the range of about 100 to 8000 poise (p), preferably about 200 to 5000 p, and more preferably about 300 to 3000 p. These ranges are subject to the accuracy of such viscosity measurements which may be plus or minus about 20%.

The Aggregate

The asphalt composition of the invention may optionally include filler materials such as various aggregates used in paving construction and various inorganic fillers as used in roofing materials and other sealants. For example, a paving mix may comprise for each 100 parts of asphalt; about 0.1 to 35 parts, preferably 5 to 25 parts, of the elastomer-copolymer additive; and about 200 to 4000, preferably about 1000 to 2000, parts of the aggregate; all parts being by weight. Thus, such paving compositions preferably comprise about 90% to 95% by weight of aggregate held together by about 5% to 10% by weight of asphalt binder.

The aggregate may be natural or artificial particulates. The natural aggregates include crushed rocks such as basalt, andesite, limestone, sandstone, andalusite and emery; gravel such as river gravel or mountain gravel; sand such as river sand, sea sand, mountain sand, silica sand or coral sand; and clays. Artificial aggregates include ground slag, calcined beauxite, corundum, Alundum, ground plastics, debris from cutting or milling metals or plastics, ground or flake glass, aluminum hydrate, calcium carbonate, carbon black and high melting or fused carbon and/or silicon compounds.

Asphalt paving compositions may include a wide range of aggregate combinations, each having its own particular characteristics and suited to specific design and construction uses. Aside from the chemical components of the asphalt, the principle characteristics of the mix may be determined by the relative amounts of coarse aggregate, medium aggregate, and fines, such as the amount of coarse aggregate retained on a number 8 sieve, the amount of medium aggregate passing a number 8 sieve and retained on a number 200 sieve, and the amount of fines passing a number 200 sieve. A complete series of asphalt aggregate compositions are specified in publications available from the Asphalt Institute, including "Specifications and Construction Methods for Asphalt, Concrete and Other Plant-Mix Types (SS-1)", and the "Asphalt Handbook" (April, 1965 edition), the entire contents of said publications being incorporated herein by reference. In selecting the asphalt composition to be mixed with the aggregate, the temperature and viscosity relationship of the asphalt composition should be taken into consideration to arrive at the proper temperature and viscosity for the construction and service applications in which the asphalt and aggregate mix is to be employed.

The Elastomer

The elastomer component of the additive is an unsaturated elastomer having at least two terminal groups each with an active hydrogen, a halogen, an epoxy oxygen or a cyanocarbon. The terminal groups with an active hydrogen may be hydroxyl, carboxyl, amino, mercapto or aziridino groups.

The starting elastomers for use in accordance with the present invention include homopolymers or copolymers, preferably liquid, from monomers selected from: $C_4$–$C_5$ diolefins and halogen substituted derivatives thereof (such as butadiene, chloroprene, isoprene and cyclopentadiene), $C_2$–$C_{15}$ straight-chain monolefins (such as ethylene, propylene and butene), $C_8$–$C_9$ aromatic vinyl compounds (such as styrene, alpha-methylstyrene and vinyltoluene), $C_3$–$C_4$ vinyl compounds (such as acrylonitrile, vinyl acetate and methylacrylate), and $C_6$–$C_7$ cyclomonoolefins (such as cyclohexene and methylcyclohexene).

Examples of such unsaturated elastomers include liquid polybutadienes, such as butadiene homopolymers (for example, 1,2-polybutadiene and 1,4-polybutadiene) and butadiene copolymers (such as styrene-butadiene copolymer, and acrylonitrilebutadiene copolymer, butadiene-isoprene copolymer and butadiene-pentadiene copolymer), all of which contain therein at least two of the foregoing functional groups per molecule, preferably in the terminal positions. Additional elastomers which may be used when they contain the foregoing functional groups include polyisoprene, polychloroprene, and certain polymers known as dehydrohalogenated chlorobutyl elastomers such as polymers C, D, and B-411S-10S available from Exxon Chemical Company. It is believed that at least these latter elastomers are capable of bonding to asphaltic constituents through a Diels-Alder condensation reaction. In addition, use can be made of elastomeric materials formed by copolymerization of one or more of the conjugated dienes described above with one or more hydroxy, amino or mercapto substituted derivatives of ethylenic monomers such as styrene, or of acrylonitrile, methacrylonitrile, acrylic acid, methacrylic acid or the like.

Preferred are the liquid polybutadienes and styrene-butadiene elastomers having an average molecular weight of about 300 to 9000, preferably 500 to 5000, and more preferably 1000 to 3400. These may be prepared by the anionic or radical polymerization of butadiene according to known methods. The liquid polybutadiene used may be mainly of either the 1,2-linkage type or the 1,4-linkage type, the polybutadienes with mainly the 1,2-linkage type being more preferably. Hydroxy-terminated homopolymers and copolymers of this type are preferred. These include high molecular weight diol polymers having molecular weights in the range of from about 1000 to 4000 and hydroxyl groups located at (terminal) or near (within 4 carbon atoms) the terminal carbon atoms of the molecule which may be separated by an amorphous chain of at least about 30 carbon atoms, more preferably at least about 40 carbon atoms. Examples of these high molecular weight diols are polybutadiene diol, polyisoprene diol, polybutadiene-styrene diol, and polybutadiene-acrylonitrile diol.

Particularly preferred are a series of hydroxy-terminated polybutadiene polymers known as Poly bd Resins available from the commercial unit of ARCO Chemical Company (a division of Atlantic-Richfield Company) at Channelview, Texas. These polymers include a butadiene homopolymer designated R-45HT and having a average molecular weight of about 2800, a butadiene homopolymer designated R-45M having an average molecular weight of about 2800, and a styrene-butadiene copolymer designated CS-15 and having a molecular weight of about 3400. The degree of polymerization is in the range of about 50 and both the homopolymers and the copolymer have polybutadiene microstructure similar to that of polybutadiene and SBR copolymers prepared by emulsion polymerization. The predominant configuration is Trans-1,4 (60%), with approximately 20% CIS-1,4 and 20% Vinyl-1,2. The terminal hydroxyl groups are primary and predominantly of the allylic type. R-45HT, R-45M and CS-15 respectively have a hydroxyl functionality of 2.4–2.6, 2.2–2.4, and 2.1–2.3; a hydroxyl value (meq./gm) of 0.83, 0.75 and 0.65; and a hydroxyl number (mg KOH/gm) of 46.6, 42.1 and 36.5. Also useful in the practice of this invention is the hydroxy-terminated butadiene-acrylonitrile copolymer designated Poly bd CN-15 having a hydroxyl number of about 39. The most preferred Poly bd resin for practicing the present invention is R-45HT.

A further embodiment of the invention for increasing the bonding between the asphalt composition and a filler and/or a substrate may be accomplished by including additional additive constituents that are vulcanizable. For example, the filler or substrate may be treated with elemental sulfur, an accelerator such as zinc dithiocarbonate which is capable of opening sulfur rings, and a coupling agent containing vulcanizable unsaturation such as vinyl triethoxysilane. When the treated filler material is introduced into the asphalt along with the other additive constituents and the resulting composition is heated, one end of a sulfur linkage may be bonded to the filler by vulcanizing the pendant groups on the coupling agent and the other end of this linkage may be bonded to the modified asphalt by vulcanization of a reactive group in the elastomeric or copolymer components, or in the asphalt component itself. The sulfur, the accelerator and/or the coupling agent also may be mixed with the asphalt along with the other additives so as to further bond the elastomer and copolymer to the asphalt by vulcanization or by direct reaction of sulfur with the asphaltene components.

Copolymer

The copolymer employed in the invention is a copolymer of an olefin monomer, preferably an aliphatic alpha-olefin, and a dienophile monomer selected from the group of anhydrides and nitriles. These dienophiles have reactive groups which are capable of reacting with the terminal groups of the elastomer. Examples of the nitriles are tetracyanoethylene and acrylonitrile. Examples of the anhydrides that may be employed include citraconic anhydride, itaconic anhydride, glutaconic anhydride, methyl itaconic anhydride, and maleic anhydride, maleic anhydride being preferred.

The aliphatic olefin monomer is preferably an alpha-olefin because olefins having the olefinic double bond in the beta position may be difficult to copolymerize. The preferred alpha-olefins are aliphatic olefins having greater than 5 carbon atoms, preferably greater than 15 carbon atoms, and more preferably having from 16 to 18 carbon atoms per molecule. Examples of suitable olefins include 1-hexadecene, 2-hexadecene, 1-heptadecene, 1-octadecene, 2-octadecene, and 2-methyl-1-heptadecene, 1-octadecene being preferred.

The molar ratio of the olefin monomer to the dienophile monomer may vary between 0.1:1 and 100:1, preferred molar ratios being between about 1:1 and about 4:1. It is desirable to react essentially all of the dienophile so that there is none remaining in the copolymer material. Both the rate at which the dienophile reacts and the total conversion of the dienophile to the copolymer can be increased by increasing the concentration of the olefinic reactant relative to that of the dienophile reactant.

The olefin is copolymerized with the dienophile in the presence of a free radical initiator such as peroxide-type polymerization initiators (for example benzoil peroxide), azo-type polymerization initiators, or radiation. The copolymerization reaction preferably is a solution-type polymerization wherein the dienophile and olefin monomers are dissolved in a common solvent, which also may be a solvent for the resulting copolymer. The copolymer has a molecular weight of at least 10,000, more preferably at least about 40,000 and most preferably about 45,000 to about 55,000. The copolymer preferably has an acid value of greater than 250, more preferably greater than about 270. Acid values lower than about 250 may not achieve the desired degree of improvement in the viscosity and ductility characteristics of the asphalt.

A preferred process for preparation of a preferred copolymer used in the present invention is described in U.S. Pat. No. 3,560,456 issued Feb. 2, 1971, the entire contents of said patent being incorporated herein by reference. This patent is assigned to Gulf Research and Development Company, Pittsburgh, PA. The copolymer, which is believed to be prepared under this patent, is designated as Gulf PA-18 and is available from Gulf Oil Chemicals Company, Shawnee Mission, KS. According to literature of Gulf Oil Chemical Company, PA-18 is a solid linear polyanhydride resin derived from 1-octadecene and maleic anhydride when these comonomers are present in a 1:1 molar ratio. Gulf PA-18 is said to have a molecular weight of about 50,000 and both hydrophobic and hydophilic properties. It is believed that a long hydrocarbon side chain provides hydrophobic properties to a copolymer that is otherwise highly polar. PA-18 is soluble in both aqueous systems and organic solvents and becomes hydrophobic upon solvent evaporation. Based on a mole weight of 50,000 and a 1:1 ratio of maleic anhydride to 1-octadecene, it is believed that one mole of the copolymer has about 142 anhydride groups. According to Gulf, PA-18 has an anhydride equivalent (meg/g) in the range of 3.10 to 3.25 and an anhydride content by weight of about 15 to about 23 percent. The acid number of PA-18 is said to be about 270-310. The copolymer melts in the range of about 110° C.-120° C., and has an acid content of 5-10 weight percent and a neutralization equivalent of 4.83-5.53 meg/g.

The Oil

Although not required for all embodiments of the invention, the foregoing copolymer is preferably premixed and with a petroleum oil which may be aromatic, cycloparaffinic, paraffinic or a mixture thereof. Preferably a major portion of the oil and most preferably all of the oil is paraffinic. The petroleum oil is believed to cause a reaction of the reactive centers provided by the dienophile, such as the anhydride units of maleic anhydride. This reaction is suggested by Fourier transform infrared spectra analyses with a Beckman 2100 FTIR instrument. This pre-reaction facilitates rapid mixture of the copolymer component with the asphalt, and also allows the copolymer component to be pre-mixed with the unsaturated elastomeric component to provide an additive with a significant shelf-life at temperatures not exceeding about 55° F. In this latter form of the additive, the petroleum oil facilitates mixing both the copolymer and the elastomer with the asphalt such that this mixing operation may be accomplished in as little as 30 seconds at asphalt temperatures just above the melting temperature of the asphalt. The melting temperature at which asphalts become sufficiently liquid for relatively easy manipulation is somewhat higher than what is commonly referred to as the softening point. The melting temperature of the preferred asphalts is less than about 140° C., which is only slightly higher than the melting point range of the PA-18 copolymer (110° C.-120° C.).

The Additive

The additive of the invention comprises the unsaturated elastomer, the copolymer and optionally the petroleum oil. Although the additive may be mixed separately from the asphalt when the copolymer has been premixed with the oil, it is to be understood that both the copolymer and the elastomer may be added separately to the asphalt without premixing with the oil and without including the oil in the additive. Thus, the term "additive" includes both the copolymer and the elastomer, and optionally the oil, even where these ingredients are added separately directly to the asphalt. All parts, percentages and ratios in this specification are by weight unless otherwise specified.

The relative quantities of the elastomer and the copolymer are selected preferably to provide approximately two reactive groups in the copolymer for each reactive group in the elastomer. However, the ratio of the reactive groups in the copolymer to the reactive groups in the elastomer may vary from about 0.5:1 to about 8:1, preferably about 1:1 to about 4:1, more preferably about 2:1. The ratio of the oil relative to the copolymer may vary from about 1:1 to about 8:1, preferably 2:1 to 6:1 and more preferably about 4:1.

For example, where the copolymer is PA-18 and the elastomer is R-45HT, two parts R-45HT to one part PA-18 provides approximately two anhydride groups in the polyanhydride for each hydroxyl group in the polybutadiene. Where used, the amount of oil is preferably 2 to 4 parts by weight relative to 1 part of the copolymer. The use of this oil may reduce the anhydride group/hydroxyl group ratio to somewhat less than 2:1 since the FTIR studies indicate that a reaction may occur between the oil and PA-18 as discussed above.

In any event, the anhydride group to hydroxyl group ratio preferably provides anhydride groups in excess of that required to react with the hydroxyl groups of the elastomer and with the oil so that excess anhydride groups are available to react with reactive groups present in the asphalt. Reactive groups of asphalt constituents are known to include hydroxyl, carboxyl and free radical groups. The above weight ratio of 2 parts R-45HT to 1 part PA-18 gives a ratio of anhydride groups to hydroxyl groups of about 2:1 based on there being about 142 anhydride groups per molecular weight of PA-18. PA-18 has a mole weight of about 50,000 and is derived from a 1:1 ratio of maleic anhydride to 1-octadecene. R-45HT has two hydroxyl groups per molecular weight, which has a value of about 2800. Where the copolymer consists essentially of the product of copolymerizing maleic anhydride and 1-octadecene and the elastomer consists essentially of a hydroxy-terminated polybutadiene, the additive of the invention preferably comprises from 0.5 to 4 parts, more preferably 1 to 3 parts and most preferably about 2 parts of the elastomer to about 1 part of the copolymer. Optionally, the additive may include preferably 0.05 to 16 parts, more preferably 1 to 8 parts, and most preferably about 2 to 4 parts of the oil to about 1 part of the copolymer. Most preferably, the additive comprises about 2 parts of the elastomer, about 4 parts of the oil and about 1 part of the copolymer.

In accordance with the invention, sufficient additive is employed in the asphaltic composition to improve substantially the ductility of the composition. The amount of additive used also may be sufficient to substantially reduce the viscosity of the asphalt composition and substantially improve its oxidation resistance and stripping resistance. The amount of the additive for paving and roofing compositions may vary from about 0.1% to about 40% by weight relative to the total weight of the modified asphalt composition. For these applications, the amount of the additive is preferably about 1% to about 30%, more preferably about 5% to about 20%.

Higher amounts of additive may be used for moldable and/or extrudable asphalt compositions. For these compositions which are more readily shaped (shapeable), the amount of the additive may be in the range of about 20% to about 99%, depending on the extent to which asphaltic characteristics are desired in the shaped product. The amount of additive for shapeable compositions preferably is in the range of about 40% to about 90%, more preferably about 45% to about 75%.

The amount of additive used relative to the amount of asphalt may vary with the composition of the particular asphalt used and the final characteristics desired. Additions of up to about 35%, more preferably up to about 30%, may be expected to produce an asphalt composition which will return to the liquid state when reheated and which is therefore acceptable for paving and roofing applications. The amount of the additive may be as low as 0.5% and still achieve a significant improvement in the final composition.

Additive amounts in the range of 35% to 50% produce a mixture that is insoluble in toluene, that may not melt when reheated, and which may be difficult to handle as a paving or roofing material because of increased viscosities. Amounts of additive approaching 50% and above by weight produce a gelled mixture which is insoluble in toluene and appears to be thermally stable up to about 400° C. with little or no loss of volatiles or thermal degradation in the form of smoke particles. Asphalt compositions containing greater than 20%, more preferably greater than 40%, and most preferably greater than 50% by weight of the additive are extrudable and moldable prior to completion of any gelling reaction and the product with more than about 35% additive appears to have the characteristics of a thermosetting type resin. Extrudable and moldable compositions should include more than 1%, preferably more than 5%, and most preferably more than 10% asphalt in order to take advantage of the influence of the asphalt component on the characteristics of the final product.

The copolymer component may be added directly to the asphalt and the mixture heated with stirring to achieve a homogeneous blend. Bubbles may appear in the asphalt at or near the melting point of the copolymer. The preferred copolymers melt at between about 90° C. and about 150° C., more preferably between about 100° C. and about 140° C., and most preferably between about 110° C. and about 120° C. Where bubbles appear, several minutes of additional heating and stirring may be required to achieve a bubble-free mixture. Once a bubble-free mixture is achieved, the unsaturated elastomer with terminal reactive groups may be added in one of two ways. First, the elastomer may be added to the already heated copolymer and asphalt mixture and then the temperature adjusted to about 150° C. to 200° C. with mixing continued until a homogeneous mixture is achieved. The copolymer asphalt mixture is preferably about 120° C. when the unsaturated elastomer is added. The second method of adding the elastomer allows the asphalt and copolymer pre-mixture to cool to ambient temperature. The elastomer is then added and the mixture heated to bring the temperature up to about 150° C. to 200° C. Stirring is commenced as soon as the mixture liquifies and is continued until a homogeneous mixture is achieved.

A premixture of the copolymer and the elastomer generally is not practicable without following the particular method of preparing a premixed additive as described below. This is believed to be due to a reaction between the elastomer and the copolymer near the melting point of the copolymer which produces an elastomeric material that is incompatible with asphalt. A preferred method of introducing the components of the additive into the asphalt comprises preparing a premixed additive by first heating the copolymer in the presence of a petroleum oil which may be paraffinic, cycloparaffinic (napthenic) or aromatic in nature, a paraffinic petroleum oil being preferred.

When the copolymer and oil are heated together with stirring, bubbles may be generated for a few minutes and then a clear homogeneous mixture without bubbles may be achieved. The resulting mixture is a viscous liquid at room temperature and appears to have an indefinite shelf-life. Fourier transform infrared spectra analysis using a Beckman 2100 instrument suggests that a chemical reaction may occur between the oil and the copolymer. Where the copolymer designated as PA-18 is used, a chemical reaction may occur at about 110° C. to about 120° C. The copolymer and oil mixture is then homogeneously blended with the elastomer and a stable composite additive is achieved which may be stored for up to about 60 days at temperatures not exceeding about 55° F. At temperatures of about 70° F., the shelf-life of this mixture drops to a few hours, after which it will undergo a reaction which may produce a polymer that is incompatible with asphalt. This composite additive has excellent miscibility with asphalt at temperatures just sufficiently high enough to render the asphalt a liquid. At asphalt liquification temperatures, the additive reacts rapidly with the asphalt. This rapid rate of reaction coupled with the excellent miscibility of the premixed additive with the asphalt provides a means of achieving a rapid and highly efficient method for chemically modifying asphalts so as to achieve an asphalt composition having the improved properties of the invention.

The copolymer and oil mixture alone also may be added directly to the asphalt with the elastomer being added separately. The copolymer and oil mixture alone also has excellent miscibility with the asphalt at temperatures just high enough to render the asphalt a liquid. Excellent mixing results may be achieved by first heating the asphalt to a temperature sufficiently high to produce a pourable liquid and then adding the copolymer and oil reaction mixture. Only minimal stirring for one or two minutes is required to produce a homogeneous asphalt mixture. The elastomer is next added and stirred for a few minutes to achieve a homogeneous blend and to complete the additive reaction.

BRIEF DESCRIPTION OF THE DRAWINGS

The invention may be further understood with reference to the accompanying drawings in which.

DESCRIPTION OF PREFERRED AND OTHER EMBODIMENTS OF THE INVENTION

The data and examples presented below will serve to illustrate the preparation of the modified asphalt composition of the present invention and the efficacy of the asphalt additive for reducing the viscosity of asphalts and improving their ductility, oxidation resistance, stripping resistance, and other characteristics. However, the invention is not limited to the particular copolymers, elastomers or oils of the additive, or to the particular asphaltic compositions containing the additive as described for purposes of illustration in the specific embodiments below. The various modifications of these specific embodiments as previously described can be employed within the skill of those knowledgeable in the art. All parts and percentages are by weight unless otherwise specified.

EXAMPLE 1

An asphalt, for example AC-3 or AC-20, is heated at about 200° C. until a viscous liquid is obtained. To 95 parts of this asphalt is added 2.5 parts of PA-18 with vigorous stirring while heating is continued until a homogeneous mixture is obtained and until the generation of gas bubbles is essentially complete. This may require about 10-15 minutes. The asphalt and PA-18 mixture is then cooled to room temperature and to this cooled mixture is added 2.5 parts of R-45HT. This ambient mixture is then heated slowly and upon liquification at about 130° C.-140° C., is mixed until homogeneous. When the resulting product is cooled to about −20° C., it exhibits improved flexibility and reduced viscosity compared to the same asphalt at the same temperature but without the additive.

EXAMPLES 2-4

To one part of PA-18 in a metal beaker are added 4 parts of paraffinic oil available from Sun Oil Company as Oil No. 2280. The beaker is then heated to 150° C. with stirring until the PA-18 is dissolved and the generation of bubbles ceases, which requires about 2 minutes and provides a clear oil solution. Upon cooling this oil solution to ambient temperature, it exhibits a long shelf-life, which is believed to be substantially indefinite. To this clear oil solution at a temperature of about 20° C. are added 2 parts of R-45HT with stirring to provide a composite embodiment of the additive of the invention.

To a metal beaker on a balance are added 15 grams of the foregoing additive and 285 grams of AC-3 asphalt which has been liquified at a temperature of about 135° C. The beaker is then placed on a hot plate maintained at about 155° C. When the asphalt and additive mixture reaches a temperature of about 150° C., it is stirred for about 5 to 7 minutes to obtain a homogeneous mixture. The resulting asphalt composition of the invention may then be cooled to ambient temperature and will remelt upon reheating to the same elevated temperatures.

The example 2 of the preceding paragraph provides a 5% additive and 95% asphalt product designated AC-3-M5. For examples 3 and 4, the same procedure is repeated twice using 30 and 60 grams, respectively, of the additive instead of 15 grams so as to provide 10% and 20% additive in asphalt products designated AC-3-M10 and AC-3-M20, respectively.

The viscosities of the products of examples 2-4 were determined and compared with the viscosity of untreated AC-3 asphalt using a Schweyer rheometer to determine the Linear Viscous Response (creep) and then from this data calculating the corresponding viscosities. In order to conduct these measurements, samples of the solid asphalt products were reheated until fluid (about 120° C. to about 150° C.) and, when completely melted, 3 to 4 grams at a time of each sample were poured into a set of capillaries for testing with the rheometer, one set for each product. Different capillaries of the same set each containing the same material were then tested at different temperatures in accordance with conventional procedures for use of this type of rheometer. From these rheometer measurements were then determined the viscosities of AC-3 and each of the products M5, M10 and M20 as shown in FIG. 1.

Figure 1:
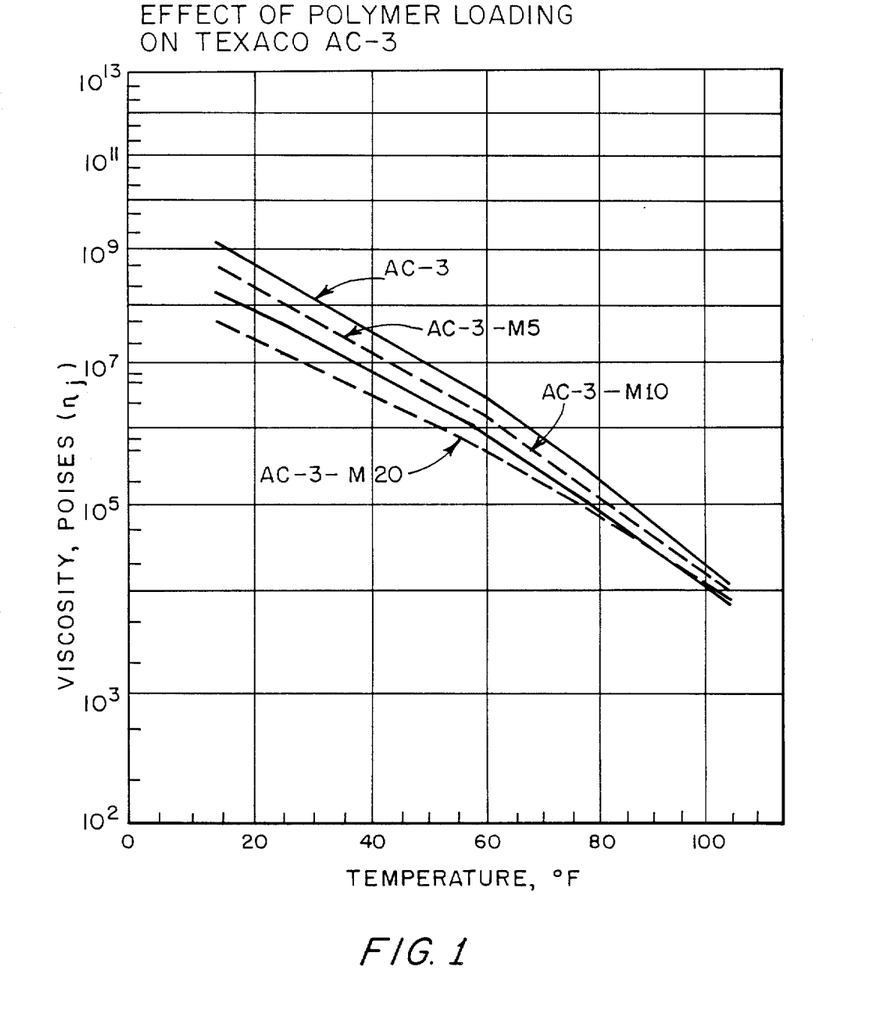
FIG. 1 is a graph showing the effect of additive loading on a Texaco AC-3 asphalt.

As can be seen in FIG. 1, the viscosity of the modified asphalts is reduced at temperatures below about 110° F. and this reduction in viscosity increases as the polymer loading is increased. Furthermore, as indicated by the decreasing slope of the viscosity-temperature lines for increasing additive loadings, the additive/asphalt blends tend to have viscosities that approach the viscosity of the untreated asphalt at higher temperatures. Thus, by extrapolation, it would appear that at temperatures of about 140° F. and higher the modified asphalts will have viscosities that are not substantially different from the viscosity of the untreated asphalt. This is highly advantageous from the standpoint of providing improved ductility at lower temperatures without adversely affecting the hardness of the asphalt at higher temperatures, such as those at which rutting might otherwise occur.

EXAMPLE 5

Figure 2:
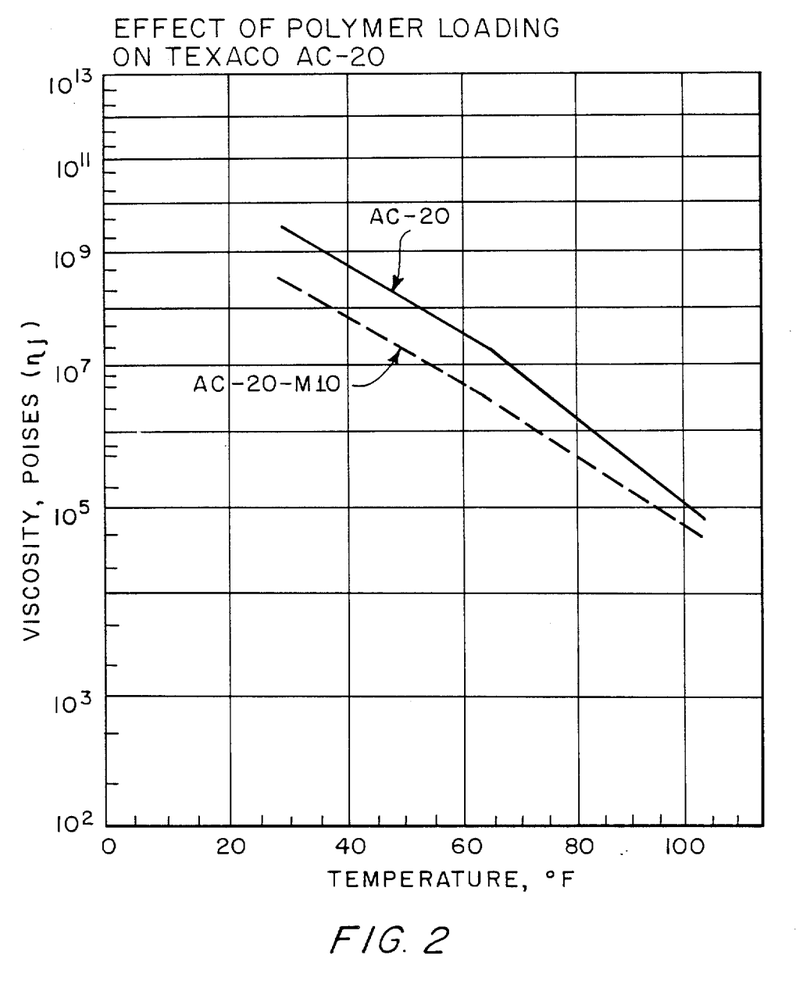
FIG. 2 is a graph showing the effect of additive loading on a Texaco AC-20 asphalt.

Example 3 is repeated using 30 grams of the additive except that the asphalt used is AC-20 instead of AC-3. This modified asphalt composition also is tested relative to unmodified AC-20 asphalt in the same manner as the products of Examples 2-4. The viscosity determinations for these asphalts are presented in FIG. 2, which shows that the AC-20 modified with the additive exhibits improvements similar to those of the AC-3 modified with the additive.

Figure 3:
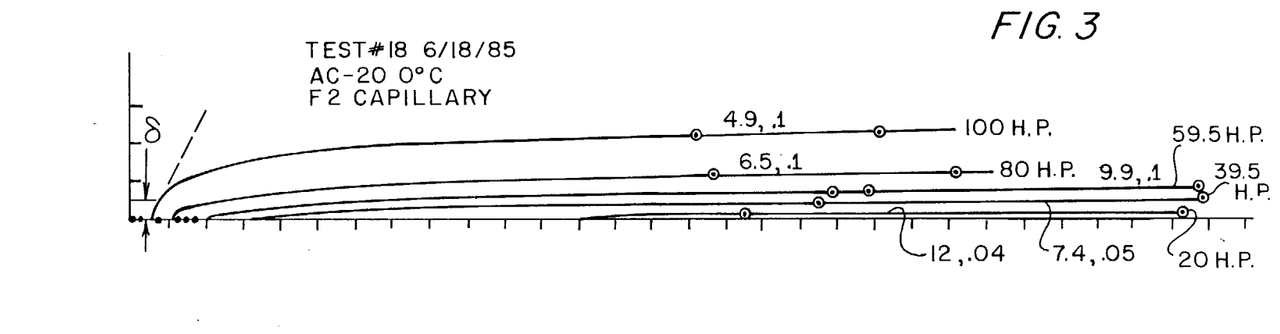
FIG. 3 is a graph of test results showing the response of an unmodified AC-20 asphalt to different stress loadings; and, FIG. 4 is a graph of test results showing the response of a modified AC-20 to different stress loadings.
Figure 4:
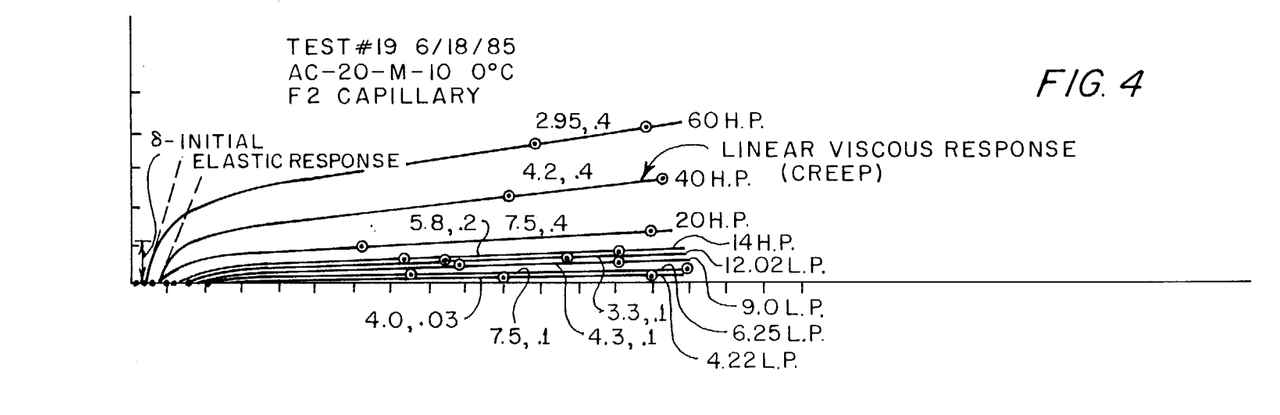

The actual data generated by the Schweyer rheometer is presented in FIG. 3 for the untreated AC-20 and in FIG. 4 for the modified AC-20 which is designated AC-20-M-10. In FIGS. 3 and 4, the indicia of the Y axis is in increments of 0.25 millimeters and the indicia of the X axis is in 2.54 centimeters (1 inch) with the curves being generated on a chart moving in the X direction at 0.4 centimeters per second. The first value given on the curve is the X axis movement relative to the second value on the curve which is the Y axis movement. The last value given is the applied pressure in pounds per square inch. From these values are calculated the viscosity which is equal to shear stress divided by shear rate.

A comparison of the curves in FIG. 3 for the untreated asphalt with the curves in FIG. 4 for the modified asphalt will further illustrate the improved characteristics of the modified asphalt composition of the invention. These tests were conducted at 0° C. The curves show the deformation and flow response at different levels of constant stress as represented by the pressure in pounds per square inch as given adjacent to the end of each curve in FIGS. 3 and 4 ("H.P." and "L.P." refer to the high pressure and low pressure gauges of the Schweyer instrument). Careful inspection of these curves reveals a significant difference between the untreated asphalt (AC-20) and the modified asphalt (AC-20-M-10). The initial elastic deformation of the tested material is designated by the delta symbol and is determined by the Y-axis value of a substantially straight initial portion of the curve. For the highest (uppermost) curves in FIGS. 3 and 4, delta is shown by the double arrows near the origin of these curves. The value of delta is determined by the point at which the curve breaks away from a substantially straight initial portion, which is represented by the straight dotted lines extending above the first and second highest curves of FIG. 3 and the first highest curve of FIG. 4.

As readily apparent from the data presented in FIGS. 3 and 4, the initial elastic deformation is substantially greater for the modified asphalt with the additive than for the untreated asphalt without the additive. Secondly, for the modified asphalt relative to the untreated asphalt, there is a noticeable reduction in the distance over which there is significant curvature of the curves after the initial elastic response but before the steady state straight line portion (e.g., from the point of intersection of the dotted line to the first encircled dot). This curvature is a measure of what may be referred to as a delayed elastic response. Reducing the delayed elastic response improves the consistency of the viscosity and ductility characteristics of the product and permits these characteristics to be more easily and accurately determined. This is because the linear viscous response (the final straight line portion reflecting a steady state response) is achieved more quickly and with less delayed elastic effects with the additive modified asphalt.

With respect to the increased slope of the linear viscous response portion of the curves of FIG. 4 relative to the curves of FIG. 3, this difference shows that the additive modified asphalts have substantially reduced viscosities relative to the untreated asphalts at the testing temperature of 0° C. (freezing conditions). Similar testing of other asphalts with other additive loadings have shown similar reductions in viscosity, the magnitudes of these reductions increasing with increased additive loadings.

Accordingly, the tested properties of the products of Examples 2–5 indicate that the addition of the additive to asphalts will provide pavement compositions with better low temperature properties while having little, if any, adverse effect on high temperature properties. It is believed that the improved elastic and plastic behavior of these products also will be beneficial in other applications, involving relatively wide ranges of climatic variations, such as sealants, adhesives, roofing materials, and other coating compositions.

The copolymer used in the additives of the preceding examples was the commercially available product known as Gulf PA-18. The additional examples below illustrate the preparation and use of copolymers made on site from aliphatic alpha-olefins and maleic anhydride.

EXAMPLE 6

A copolymer of maleic anhydride and 1-hexadecene is prepared by adding with stirring 269.4 grams (1.2 moles) of 1-hexadecene to a reaction mixture consisting essentially of 200 grams (1.8 moles) of propylene dichloride, 58.8 grams (0.6 mole) of maleic anhydride and 1.5 grams (0.006 mole) of benzoyl peroxide. This mixture is heated with stirring under a blanket of nitrogen for about 10 minutes to remove oxygen. The polymerization reaction is carried out in a resin kettle fitted with an air condenser. A polymerization temperature of 117° C. is maintained for six hours at atmospheric pressure.

The resulting mixture containing the copolymer of maleic anhydride and 1-hexadecene is slowly added to two liters of stirred isopropanol at room temperature. The copolymer then forms a white solid that is separated by filtering. This solid copolymer is washed twice with two 1-liter portions of isopropanol and finally dried overnight in a vacuum oven at room temperature.

A commercially available asphalt is heated to form a liquid of low viscosity. To 95 parts of this asphalt is added 2.5 parts of the maleic anhydride and 1-hexadecene copolymer with vigorous stirring while heating until a homogeneous mixture is obtained and until the generation of gas bubbles has stopped. This step requires about 10–15 minutes. The asphalt-copolymer mixture is then cooled to room temperature at which time 2.5 parts of R-45HT are added to this mixture. The resulting ambient temperature mixture is then heated slowly until liquification occurs (near 135° C.) and thereafter is mixed until homogeneous. When the resulting asphalt product is cooled to about −20° C., it exhibits improved flexibility and reduced viscosity when compared to a control sample of untreated asphalt under the same conditions.

EXAMPLE 7

To one part of the maleic anhydride and 1-hexadecene copolymer of Example 6 in a metal beaker are added 4 parts of paraffinic oil available from Sun Oil Company as Oil No. 2280. The beaker is then heated to 150° C. with stirring until the copolymer dissolves and the generation of gas bubbles ceases. This requires about 2 minutes and a clear oil solution results. This solution when cooled to room temperature has a shelf-life which is believed to be indefinite. To this clear oil solution at a temperature of about 20° C. may be added 2 parts of R-45HT with stirring to provide a composite embodiment of the additive of the invention.

Examples 6 and 7 confirm that results similar to those reported in Examples 1–5 are also obtained when 1-hexadecene is substituted for 1-octadecene in the polyanhydride copolymer.

EXAMPLE 8

A copolymer of maleic anhydride and 1-heptadecene is prepared by adding with stirring 288.6 grams (1.2 moles) of 1-heptadecene to a reaction mixture consisting essentially of 200 grams (1.8 moles) of propylene dichloride, 58.8 grams (0.6 mole) of maleic anhydride and 1.5 grams (0.006 mole) of benzoyl peroxide. This mixture is heated with stirring under a blanket of nitrogen for about 10 minutes to remove oxygen. The polymerization reaction is carried out in a resin kettle fitted with an air condenser. A polymerization temperature of 117° C. is maintained for six hours at atmospheric pressure.

The resulting mixture containing the copolymer of maleic anhydride and 1-heptadecene is slowly poured into 2 liters of isopropanol at room temperature. The copolymer then forms a white solid that is separated by filtering. This solid copolymer is washed twice with 1 liter portions of isopropanol and finally dried overnight in a vacuum oven at room temperature to remove any volatile components.

The maleic anhydride and 1-heptadecene copolymer is thereafter mixed with an asphalt and the R-45HT elastomer following the procedures of Example 6. The resulting asphalt product exhibits similarly improved flexibility and reduced viscosity when cooled to about $-20°$ C. This confirms that results similarly to those reported in Examples 1-5 are also obtained when 1-heptadecene is substituted for 1-octadecene in the polyanhydride copolymer.

What is claimed is:

1. An asphalt composition comprising a reaction product from reaction of a copolymer and an unsaturated elastomer in the presence of an asphalt;
   said copolymer having substantial anhydride functionality and comprising a reaction product from reaction of an anhydride and an olefin; and
   said unsaturated elastomer having at least two terminal allylic groups.

2. An asphalt composition according to claim 1 which further includes a petroleum oil.

3. An asphalt composition according to claim 2 in which said oil is paraffinic or cycloparaffinic.

4. An asphalt composition according to claim 1 in which said alpha-olefin is an aliphatic olefin.

5. An asphalt composition according to claim 4 in which the number of carbon atoms in said aliphatic olefin is greater than 5.

6. An asphalt composition according to claim 4 in which the number of carbon atoms in said aliphatic olefin is greater than 15.

7. An asphalt composition according to claim 4 in which the number of carbon atoms in said aliphatic olefin is in the range of 16 to 18.

8. An asphalt composition according to claim 1 in which said olefin is 1-hexadecene; 2-hexadecene; 1-heptadecene; 1-octadecene; 2-octadecene; or 2-methyl-1-heptadecene.

9. An asphalt composition according to claim 1 in which said olefin is 1-octadecene and said elastomer is a hydroxy-terminated polybutadiene.

10. An asphalt composition according to claim 1 in which said olefin is 1-octadecene and said anhydride is maleic anhydride.

11. An asphalt composition according to claim 10 in which said elastomer is a polychloroprene polymer, a nitrile-butadiene polymer, a styrene-butadiene polymer or a polybutadiene polymer.

12. An asphalt composition according to claim 1 in which said elastomer is capable of undergoing a Diels-Alder reaction with at least one constituent of said asphalt.

13. An asphalt composition according to claim 1 in which said copolymer has a molecular weight of at least about 10,000.

14. An asphalt composition according to claim 1 in which said copolymer has a molecular weight of at least about 40,000.

15. An asphalt composition according to claim 1 in which said copolymer is a polyanhydride.

16. An asphalt composition according to claim 1 in which said olefin is 1-hexadecene, 2-hexadecene; 1-heptadecene; 1-octadecene, 2-octadecene, or 2-methyl-1-heptadecene; in which said anhydride is maleic anhydride, citraconic anhydride, itaconic anhydride, glutaconic anhydride or methyl itaconic anhydride; and in which said elastomer is a polychloroprene polymer, a nitrile-butadiene polymer, a styrene-butadiene polymer or a polybutadiene polymer.

17. An asphalt composition according to claim 10 in which said elastomer is a hydroxy-terminated polybutadiene.

18. An asphalt composition according to claim 1 which further includes solid particles of a natural or synthetic filler material.

19. An asphalt composition according to claim 1 in which said copolymer and said elastomer are present in relative amounts sufficient to lower the viscosity of said asphalt.

20. An article of manufacture comprising a substrate coated with an asphalt composition according to claim 1.

21. An asphalt composition comprising a reaction product from reaction of:
    an asphalt;
    a copolymer having substantial anhydride functionality and comprising a reaction product from reaction of an olefin and an anhydride; and,
    an unsaturated elastomer having at least two terminal groups at least one of which is an allylic hydroxyl group and the other of which has an active hydrogen, a halogen, an epoxy oxygen or a cyanocarbon.

22. A method of preparing an asphalt composition comprising:
    mixing a petroleum oil with a copolymer having substantial anhydride functionality and comprising a reaction product from reaction of an anhydride and an olefin; and,
    mixing and reacting said copolymer and oil mixture with an unsaturated elastomer in the presence of an asphalt, said unsaturated elastomer having at least two terminal groups at least one of which is an allylic hydroxyl group and the other of which has an active hydrogen, a halogen, an epoxy oxygen or a cyanocarbon.

23. The method according to claim 22 in which said oil is paraffinic or cycloparaffinic.

24. The method according to claim 22 in which said olefin is 1-octadecene, said anhydride is maleic anhydride, and said unsaturated elastomer is a hydroxy-terminated polybutadiene.

25. A method according to claim 24 in which said oil is paraffinic.

26. A method according to claim 22 in which said copolymer and oil mixture is first mixed with said unsaturated elastomer and thereafter mixed with said asphalt.

27. An asphalt composition prepared by copolymerizing maleic anhydride and an aliphatic olefin in the presence of a free radical initiator to provide a copolymer product having substantial anhydride functionality, and thereafter mixing and reacting said copolymer product with an unsaturated elastomer in the presence of an asphalt, said unsaturated elastomer having at least two terminal allylic hydroxyl groups.

28. The composition of claim 27 in which said aliphatic olefin is 1-octadecene, and said unsaturated elastomer is a hydroxy-terminated polybutadiene.

29. The composition of claim 27 in which said copolymer product is uniformly mixed with a petroleum oil before being mixed with said asphalt and said unsaturated elastomer.

30. An asphalt composition according to claim 29 in which said copolymer product and oil mixture is first mixed with said unsaturated elastomer and thereafter mixed with said asphalt.

31. An asphalt composition comprising a reaction product from reaction of a copolymer and an unsaturated elastomer in the presence of an asphalt; said copolymer having substantial anhydride functionality and comprising a reaction product from reacting an olefin with an anhydride; and said unsaturated elastomer having at least two terminal groups at least one of which is an allylic hydroxyl group and the other of which has an active hydrogen, a halogen, an epoxy oxygen, or a cyanocarbon.

32. An asphalt composition according to claim 31 in which said olefin is an aliphatic alpha-olefin.

33. An asphalt composition according to claim 32 in which said anhydride is maleic anhydride, citraconic anhydride, itaconic anhydride, glutaconic anhydride or methyl itaconic anhydride.

34. An asphalt composition according to claim 33 in which said olefin is 1-hexadecene; 2hexadecene; 1-heptadecene; 1-octadecene; 2-octadecene; or 2-methyl-1-heptadecene; in which both of said hydroxyl groups are of the allylic type; and in which said elastomer is a polychloroprene polymer, a nitrile-butadiene polymer, a styrene-butadiene polymer or a polybutadiene polymer.

35. An asphalt composition according to claim 31 in which said copolymer product is first mixed with a petroleum oil and thereafter the resulting copolymer and oil product is mixed and reacted with said asphalt and said elastomer.

36. An asphalt composition according to claim 1 which is a paving composition further comprising solid particles of a natural or synthetic aggregate.

37. An asphalt composition according to claim 27 in which said unsaturated elastomer is a butadiene homopolymer, a butadiene-styrene copolymer, a butadiene-acrylonitrile copolymer, or a mixture thereof.

38. An asphalt composition comprising a reaction product from reaction of:
an asphalt;
an additive comprising a copolymer mixed with a petroleum oil, said copolymer having substantial anhydride functionality and comprising a reaction product from reaction of an anhydride and an alpha-olefin; and,
an unsaturated elastomer having at least two terminal groups at least one of which is an allylic hydroxyl group and the other of which has an active hydrogen, a halogen, an epoxy oxygen or a cyanocarbon.

39. An asphalt composition according to claim 38 in which said copolymer is first mixed and heated with said petroleum oil and the resulting mixture is thereafter reacted with said unsaturated elastomer.

40. An asphalt composition according to claim 39 in which both of said terminal groups are allylic hydroxyl groups, and said anhydride comprises maleic anhydride.

41. An asphalt composition according to claim 21 in which both of said terminal groups are allylic hydroxyl groups, and said anhydride comprises maleic anhydride.

42. An asphalt composition according to claim 22 in which both of said terminal groups are allylic hydroxyl groups, and said anhydride comprises maleic anhydride.

43. An asphalt composition according to claim 31 in which both of said terminal groups are allylic hydroxyl groups, and said anhydride comprises maleic anhydride.

44. An asphalt composition according to claim 21 in which both of said terminal groups are allylic hydroxyl groups, and said copolymer is a polyanhydride having an anhydride equivalent in the range of 3.10 to 3.25 meg/g.

45. An asphalt composition according to claim 21 in which both of said terminal groups are allylic hydroxyl groups, and said copolymer is a polyanhydride having an anhydride content by weight of about 15% to about 23%.

46. An asphalt composition according to claim 31 in which both of said terminal groups are allylic hydroxyl groups, and said copolymer is a polyanhydride having an anhydride equivalent in the range of 3.10 to 3.25 meg/g.

47. An asphalt composition according to claim 31 in which both of said terminal groups are allylic hydroxyl groups, and said copolymer is a polyanhydride having an anhydride content by weight of about 15% to about 23%.

48. A method according to claim 22 which further comprises heating said copolymer and oil mixture before said mixture is mixed and reacted with said unsaturated elastomer in the presence of the asphalt.

49. A method according to claim 48 which further comprises cooling said heated copolymer and oil mixture before said mixture is mixed and reacted with said unsaturated elastomer in the presence of the asphalt.

50. A method according to claim 49 which further comprises mixing said cooled copolymer and oil mixture with said unsaturated elastomer, and thereafter heating said copolymer, oil and elastomer mixture in the presence of said asphalt.

* * * * *